Dec. 23, 1969     P. L. EPSTEIN     3,486,104
POWER SUPPLY WITH NOVEL RIPPLE CONTROL
Filed Sept. 5, 1967                                2 Sheets-Sheet 2

INVENTOR.
BY Philip L. Epstein
Morse, Altman + Oates
ATTORNEYS

United States Patent Office 3,486,104
Patented Dec. 23, 1969

3,486,104
POWER SUPPLY WITH NOVEL RIPPLE CONTROL
Philip L. Epstein, Elizabeth, N.J., assignor to Quindar Electronics, Inc., Springfield, N.J., a corporation of Delaware
Filed Sept. 5, 1967, Ser. No. 665,558
Int. Cl. H02m 1/14
U.S. Cl. 321—10                                     4 Claims

ABSTRACT OF THE DISCLOSURE

A power supply, which has an alternating current input, a full wave rectifying bridge and a filter, is provided with regulator and feedback circuitry, in which sensitivity to an error signal resulting from ripple output is increased by anticipatory application of the intital ripple signal to the feedback circuitry.

Background and summary of the invention

The present invention relates to power supplies and, more particularly, to power supplies of the type in which alternating current power is applied through a transformer to a full wave rectifier and a filter, by which substantially direct current with an undesired minor alternating current or ripple, component is generated.

The primary object of the present invention is to provide, in such a power supply, a regulator circuit through which the direct current output is transmitted, an error control circuit for comparing the voltage in the regulating circuit with a pre-set reference voltage and an anticipator circuit by which the ripple signal from the filter is applied directly to the error circuit in order to maximize its sensitivity. It has been found that this direct application of the ripple signal to the error circuit is much more effective than would be a large increase in the amplification fatcor of the regulator circuit, for the reason that the later approach would tend to render the regulating circuit unstable, and consequently, the operation of the entire circuit more critical.

Another object of the present invention is to mount the electronic components of the foregoing power supply in an extremely compact mechanical unit characterized by a small heat sink upon which regulating stages, which are responsible for most of the heat generation, are mounted. The electronic configuration is such that the heat generating compounds are sufficiently few in number to permit their being mounted on such a compact heat sink.

Other objects of the present invention will in part be obvious and will in part appear hereinafter.

The invention accordingly comprises the electronic circuitry and mechanical arrangement, and the relationships among their components, which are exemplified in the following detailed description and shown in the accompanying drawings.

Brief description of the drawing

For a fuller understanding of the nature and objects of the present invention, reference is made to the following detailed description, taken in connection with the accompanying drawings, wherein.

Detailed description of the preferred embodiment

Figure 1:
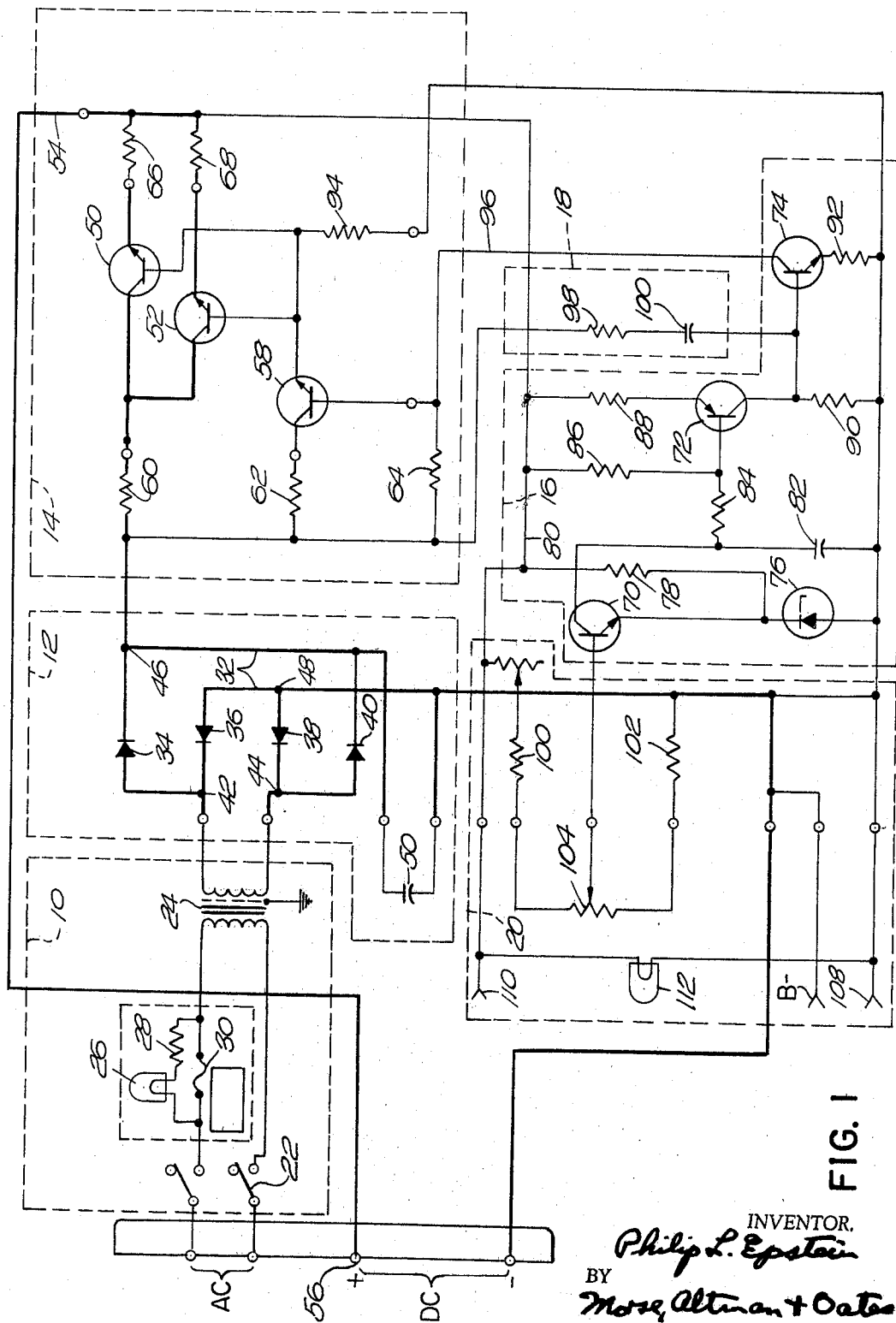
FIG. 1 is an electrical schematic of a preferred embodiment of the present invention.

The circuit of FIG. 1 comprises an input circuit 10 for applying an alternating current, a rectifier circuit 12 for producing therefrom a direct current having an undesired ripple frequency, a regulator circuit 14 through which the direct current output of the rectifier circuit is applied to suitable output terminals, an error circuit 16 for controlling regulating circuit 14 in response to an output signal derived therefrom, an anticipator circuit 18 for applying the ripple signal from rectifier circuit 12 directly to error circuit 16 and a voltage balancing circuit 20. The construction primarily is characterized by the function of anticipator circuit 18 which serves to apply a ripple voltage signal from rectifier 12, which represents the undesired ripple voltage of the output, to error circuit 16 in order to apply control to regulator circuit 14, by which the speed and sensitivity of the regulator circuit are greatly improved.

As shown, the alternating current input from a suitable alternating current power source is applied through a double throw switch 22 to the primary of a transformer 24, both of which constitute components of input circuit 10. Input circuit 10 also includes a pilot light 26, a balast resistor 28 and a fuse 30 in parallel therewith. The secondary of transformer 24 applies a voltage-reduced alternating current to the input of rectifier and filter circuit 12.

Circuit 12 comprises a full wave rectifying bridge 32 having four diodes 34, 36, 38 and 40. These diodes are arranged in two channels 35, 36 and 38, 40, in both of which channels the diodes are in parallel. The terminals of the secondary of transformer 24 are connected to the junctions between the diodes of one channel and between the junctions of the diodes of the other channel, these junctions being designated 42, 44. The direct current outputs of the bridge are at 46, 48, which constitute the terminals of both of the channels. Connected across outputs 46, 48 is a filtering capacitor 50 by which some of the undesired ripple signal is removed from the output. The direct current, together with its undesired ripple component, is applied to regulator circuit 14.

The direct current path is channeled through a pair of parallel transistor stages 50, 52 to lead 54, which is connected to output terminal 56. Transistor stages 50, 52 constitute a series regulator for the output current, which is under the control of a transistor stage 58 that is responsive to the ripple component of the output of circuit 12 as well as to the error voltage of circuit 16 in a manner to be described below. As shown, the collectors of transistor stages 50, 52 are joined and coupled to the output of circuit 12 by a resistor 60. Transistor stage 58 is biased by a base resistor 64, the emitter of transistor stage 58 being connected directly to the bases of transistor stages 50, 52. Resistor 62 serves to limit collector current. The emitters of transistor stages 50, 52 are connected to output line 54 by current sharing resistors 66, 68.

Error circuit 16 comprises three cascaded amplifier stages 70, 72 and 74. The input to stage 70 is the difference between the voltage of constant voltage reference diode 76, and a portion of the output of regulator circuit 14, obtained by division of the output by the resistor chain including resistors 100, 104 and 102. Resistor 104 is a potentiometer, which provides for adjustment of the division ratio and hence provides means for minor adjustment in the output voltage of the power supply. The voltage reference (Zener) diode is supplied with operating current by resistor 80. The collector of transistor 70 is coupled to the base of transistor 72 by the divider network comprising resistors 84 and 86. Resistor 88 controls the emitter current of transistor 72 and resistor 90 supplies voltage to the collector. Capacitor 82 has a low value which shapes the high-frequency roll-off of the error amplifier to enhance the stability of the feedback circuit. The collector of stage 72 is directly coupled to the base of stage 74, the emitter current of which is controlled by resistor 92.

In addition to the amplified error signal from the collector of transistor stage 72, the base of transistor 74 also is supplied with the ripple component of the output of rectifier circuit 12. The ripple is applied to the base of transistor 74 by a resistor 98. The capacitor 100 serves to remove the direct current component of this signal, allowing only the ripple to be applied to the base. Resistor 98 and a capacitor 100 constitute anticipator circuit 18. By virtue of the operation of this circuit, transistor 74 is enabled to control the output of regulator stages 50, 52 in such a way as to cancel the undesired ripple to a much greater degree than would otherwise be possible with an error amplifier circuit of comparable gain. To achieve the same result by increasing the gain of the error amplifier would pose serious stability problems in the feedback control circuit.

The collector of amplifier 74 is directly connected to the base of amplifier 58, which is emitter-coupled to the base of amplifier 58, which is emitter-coupled to the two regulators 50 and 52.

Pilot lamps 112 provides an indication of operativeness of the unit.

Figure 2:
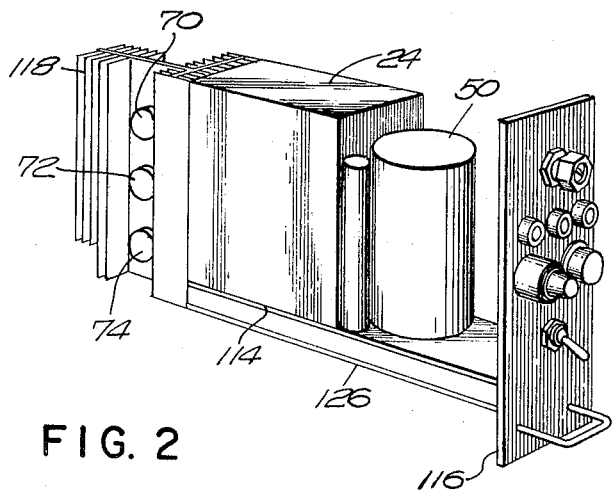
FIG. 2 is a perspective view of the mechanical construction of the power supply of FIG. 1.
Figure 3:
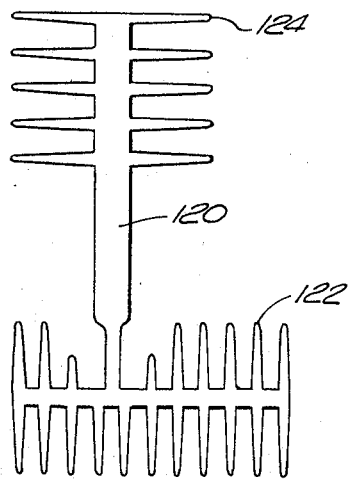
FIG. 3 is a side elevation of the heat sink of the mechanical construction of FIG. 2.

In FIG. 2 the mechanical configuration of the unit is shown as comprising a support having a support horizontal panel 114 and a vertical front panel 116. The large components are shown as including transformer 24 and capacitor 50. Transistors 70, 72 and 74 are shown mounted on a heat sink 118, the precise configuration of which is shown on FIG. 3. Heat sink 118 includes a central body portion 120 which extends rearwardly face plate 116. Across the forward end of body 120 is an array of vertical fins 122. At the rearward end of body 120 is an array of vertical fins 124. It will be noted that fins 122 extend from along a line that is parallel with respect to body 120 and fins 124 extend along a line that is crossed with respect to body portion 20. Body portion mounts the transistor stages referred to above. The remainder of the electronic components are mounted on a horizontal printed circuit board 126, as well as on front panel 116 in a manner that need not be shown.

Conclusion

The present invention thus provides a simplified power supply that by virtue of its electronic configuration, particularly its simplicity and responsiveness, can be confined to an extremely small space in the presence of an extremely small heat sink. Since certain changes may be made in the foregoing disclosure without departing from the scope of the invention herein, it is intended that all matter contained in the accompanying foregoing specification and shown in the accompanying drawing be interpreted in an illustrative and not in a limiting sense.

What is claimed is:

1. A power supply comprising an input transformer means, full wave rectifying means for receiving an alternating current from said transformer means, filter capacitor means for reducing the ripple component of the output of said full wave rectifying means, regulating means through which said output of said full wave rectifying means is applied to an output terminal, error means including a reference voltage means, anticipator means for applying a signal directly from said full wave rectifying means to said error means, said reference diode means comparing said signal from said anticipator means with a preset reference voltage, the output of said error means being applied as a feedback signal to said regulator means.

2. A power supply comprising an input transformer, a full wave rectifying bridge circuit powered by said input transformer, a filter capacitor across said bridge circuit for reducing the ripple component of the output theeof, a regulator circuit including a plurality of cascaded amplifiers, an output terminal for the signal produced by said regulator circuit, an error circuit including a comparator stage and a Zener diode for applying a reference voltage thereto, an anticipator circuit for applying a signal directly from bridge circuit to said comparator stage, said error circuit comprising the voltage applied by said anticipator circuit with the reference voltage of said Zener diode to provide a control signal for said regulator circuit.

3. The power supply of claim 2 wherein said anticipator circuit includes a resistor and a capacitor connected serially between the output of said bridge circuit and said error circuit.

4. The power supply of claim 3 wherein said error circuit includes a first transistor stage, a second transistor stage and a third transistor stage, each of the stages having a base terminal and a pair of collector-emitter terminals, the base terminal of said first transistor stage being controlled by a voltage balance resistor, one of said collector-emitter terminals of said first transistor stage being connected to a terminal of said Zener diode, the other of said collector-emitter terminals of said first transistor stage being resistively connected to said base terminal of said second transistor stage, one of said collector-emitter terminals of said second transistor stage being connected to said base terminal of said third transistor stage, said capacitor of said anticipator circuit also being connected to said base terminal of said third transistor stage.

References Cited

UNITED STATES PATENTS

| | | | |
|---|---|---|---|
| 3,319,150 | 5/1967 | Elich et al. | 321—11 XR |
| 3,323,033 | 5/1967 | Lorentzen et al. | 321—11 XR |
| 3,323,034 | 5/1967 | Dubin et al. | 321—16 |
| 3,371,269 | 2/1968 | Wattson | 321—10 XR |

LEE T. HIX, Primary Examiner

W. M. SHOOP, Jr., Assistant Examiner

U.S. Cl. X.R.

321—18; 323—22